United States Patent
Brombach et al.

(10) Patent No.: US 9,484,749 B2
(45) Date of Patent: Nov. 1, 2016

(54) ELECTRIC POWER SUPPLY SYSTEM FOR AN AIRCRAFT, AIRCRAFT AND AIRPORT POWER SUPPLY SYSTEM

(71) Applicant: AIRBUS OPERATIONS GMBH, Hamburg (DE)

(72) Inventors: Johannes Brombach, Berlin (DE); Detlef Schulz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 463 days.

(21) Appl. No.: 14/050,734

(22) Filed: Oct. 10, 2013

(65) Prior Publication Data

US 2014/0132062 A1        May 15, 2014

Related U.S. Application Data

(60) Provisional application No. 61/713,663, filed on Oct. 15, 2012.

(30) Foreign Application Priority Data

Oct. 15, 2012 (EP) .................................... 12188512

(51) Int. Cl.
*B60L 1/00*        (2006.01)
*B60L 3/00*        (2006.01)
*H02G 3/00*        (2006.01)
(Continued)

(52) U.S. Cl.
CPC . *H02J 4/00* (2013.01); *B64F 1/34* (2013.01); *B64D 2221/00* (2013.01); *Y02T 50/54* (2013.01); *Y02T 50/82* (2013.01)

(58) Field of Classification Search
CPC .......... H02J 7/1423; H02J 7/345; H02J 3/32; H02J 5/005; H02J 7/34; H02J 1/102; H02J 4/00; H02J 7/0054; H02J 7/022; H02J 17/00; H02J 1/10; H02J 1/14; H02J 3/36; H02J 7/0016; H02J 7/0029
USPC .......................................................... 307/9.1
See application file for complete search history.

(56) References Cited

U.S. PATENT DOCUMENTS 4,684,825 A * 8/1987 Sachs ........................ B64F 1/34
                                                        307/113
8,339,810 B2 * 12/2012 Ratnaparkhi ....... H02M 5/4585
                                                        323/267

(Continued)

FOREIGN PATENT DOCUMENTS

EP        1 928 745        6/2012

*Primary Examiner* — Jared Fureman
*Assistant Examiner* — Esayas Yeshaw
(74) *Attorney, Agent, or Firm* — Jenkins, Wilson, Taylor & Hunt, P.A.

(57) ABSTRACT

The present invention relates to an electric power supply system for an aircraft having a transformer-less HVDC architecture, the system including: at least one multiphase engine generator in a star configuration which provides a multiphase alternating (AC) voltage; a converting circuit for converting the multiphase AC voltage into a corresponding direct (DC) voltage for supplying at least one aircraft load; an electric power supply interface for connection with a standardized GPU plug of an external GPU, the electric power supply interface comprising a supply voltage output terminal coupled to a self-contained power source for providing a low voltage control signal for driving a GPU internal switching circuit wherein the power source is decoupled from the AC voltage and DC voltage. The present invention further relates to an aircraft and an airport power supply system.

14 Claims, 6 Drawing Sheets

(51) Int. Cl.
*H02J 4/00* (2006.01)
*B64F 1/34* (2006.01)

(56) References Cited

U.S. PATENT DOCUMENTS

| | | | | |
|---|---|---|---|---|
| 2004/0011918 A1* | 1/2004 | Musial | ............... | B64F 1/34 244/1 R |
| 2007/0287306 A1* | 12/2007 | Hu | ............... | H02H 9/08 439/94 |
| 2008/0103632 A1* | 5/2008 | Saban | ............... | H02K 3/28 700/286 |
| 2009/0134700 A1* | 5/2009 | Tanaka | ............... | B62D 5/046 307/10.6 |
| 2010/0078019 A1* | 4/2010 | Rittner | ............... | A62B 9/00 128/202.26 |
| 2010/0080030 A1* | 4/2010 | Wiegman | ............... | B60L 11/1868 363/131 |
| 2011/0133573 A1* | 6/2011 | Ratnaparkhi | ......... | H02M 7/217 307/154 |
| 2012/0176084 A1* | 7/2012 | Klaes | ............... | B60L 11/1803 320/107 |
| 2012/0211981 A1* | 8/2012 | De Wergifosse | ....... | F02C 7/275 290/31 |

* cited by examiner

ELECTRIC POWER SUPPLY SYSTEM FOR AN AIRCRAFT, AIRCRAFT AND AIRPORT POWER SUPPLY SYSTEM

CROSS-REFERENCES TO RELATED APPLICATIONS

This application claims benefit of and priority to U.S. Provisional Application No. 61/713,663, filed Oct. 15, 2012, and European Patent Application No. 12 188 512.3, filed Oct. 15, 2012, the entire disclosures of which are incorporated herein by reference.

TECHNICAL FIELD

The present invention relates to an electric power supply system for an aircraft having a transformer-less HVDC architecture. The present invention further relates to an aircraft and an airport power supply system.

BACKGROUND

Aircraft, in particular passenger aircraft, comprise a large number of electric loads which require electrical power for the operation thereof. For this purpose, modern aircraft comprise an on-board electrical system. European patent EP 1 928 745 B1 discloses such an energy supply system in an aircraft. The present invention and its underlying problem will hereinafter be described on the basis of an on-board power supply system for an aircraft, however, without restricting the invention to this sort of application. It shall be most understood that an on-board power supply system comprises both an AC and DC power supply, whereas the present invention is directed to the operation of a DC voltage.

A major goal of the aviation industry is the reduction of emissions in combination with cost efficiency. On the one hand eco-friendly aircraft can result in cost savings because of the forecasted rising fuel prices in the future. On the other hand environmental pollution is in the center of actual public discussions. Therefore, one major issue in the development of modern aircraft is the reduction of weight which has a direct impact on reduced fuel consumption. During normal operation of an aircraft, the on-board electrical systems use only 0.2% of the whole energy provided by the aircraft engines; hence savings in the electricity consumption have only a small impact on the aircraft's fuel consumption. However, with the "More Electric Aircraft"-concept the complexity of the on-board electrical system is increasing and consequently also the weight of their electric wiring. In conclusion saving weight has a huge impact on eco-efficiency and fuel consumption.

The present patent application refers to the use and integration of HVDC in the on-board power supply system of modern aircraft. Modern on-board electric power supplies use so called HVDC (High voltage DC). HVDC enables DC output voltages of +/−135 V, 270V/0V and +/−270V depending on the engine generators and the driving circuitry. HVDC based power supply in an aircraft is in particular advantageous with regard to weight reduction approaches, however, the implementation of HVDC within the power supply system is not trivial and needs some additional effort.

Modern aircraft with HVDC comprise a 3-phase on-board electrical system having a supply voltage of 115 Volt or 230 Volt. The electrical power is generated by engine generators which in turn are driven by the engines of the aircraft. The engine generators generate an alternating voltage (AC) of variable frequency. The AC frequency can vary in a relatively wide frequency range of for example 360-800 Hz as a function of the rotational speed of the engine. Earlier on-board electrical system provided a constant frequency of 400 Hz which was generated via a so-called constant speed drive (CSD). A constant speed drive (CSD) is a mechanical gearbox that takes an input shaft rotating at a wide range of speeds, delivering this power to an output shaft that rotates at a constant speed, despite the varying input. They are used to drive alternating current (AC) electrical generator that require a constant input speed.

Bigger loads are connected to all three phases of the power supply, whereas smaller loads are typically connected only between one phase and the aircraft chassis which allows avoiding the weight consuming return conductor. In order to provide a more efficient, especially weight efficient on-board power supply, it may be possible to increase the AC voltage provided by the generator. This way, the weight may be reduced. However, in all energy supply concepts and especially with a HVDC power supply the existing airport and airline infrastructure has to be taken into account too. An aircraft has two possibilities to supply the electric loads while the engines are switched off:

The first one is using the traditional auxiliary power unit (APU). The problem when using the APU is an efficiency of only 8%, comparably high kerosene consumption and a high level of noise emission. Because of that the use of the APU is not allowed at some airports. Therefore, in modern aircraft a multifunctional fuel cell system may be used in order to reduce pollution during ground operation. However, integrating such a fuel cell system would make an adaption of the primary aircraft grid necessary, such as the introduction of a high voltage DC (HVDC) level.

The second possibility is to supply electric energy to the aircraft via external systems such as ground power units (GPU). A GPU is a type of auxiliary power unit (APU) used on the ground at airports to supply electric power toward aircraft on the ground, to sustain interior lighting, ventilation and other requirements before starting of the main engines or the aircraft auxiliary power unit (APU). This may be a self-contained engine-generator set, or it may convert commercial power from the local electrical grid to the voltage and frequency needed for the aircraft. A standardized GPU allocates 115 V AC with a fixed frequency of 400 Hz and a maximum power of 90 kVA per unit. In order to connect the GPU to the aircraft, aircraft have a standardized connector to feed the electrical system externally. At that connector mobile APU-cars or an inverter, fed by the airport grid, can be connected.

There are different approaches to implement a HVDC based aircraft power supply, each with specific benefits, however, also with some needs especially with regard to the implementation of the different voltage levels of the HVDC. In one known approach, which is used in Boeing's 787 (Aero Quarterly QTR_04/07, Mike Sinnett, "787 No-Bleed Systems: Saving Fuel and Enhancing Operational Efficiencies", pages 6-11), the 230 Volt AC voltage which is generated by the engine generators 1 of the aircraft is rectified in a rectifier circuit 2. This generates a ±270 Volt supply voltage at the DC output. Consequently, the loads 3 (without any voltage divider means) have to be laid out for a supply voltage of 540 Volt. The aircraft chassis 4 (fuselage) is connected to the airport earth 5 which forms the common ground or reference potential of the aircraft and the GPU 6. In this approach, no reverse connector is needed since this function is fulfilled by the grounded aircraft body. However, with this approach additional transformers 7 are needed in order to couple the 115 Volt powered GPU 7 to the on-board HVDC of the aircraft.

SUMMARY

Accordingly, it is an idea of the present invention to provide an efficient implementation of an HVDC architecture for use in an aircraft electrical power supply system.

Accordingly it is provided:

An electric power supply system for an aircraft, in particular having a transformer-less HVDC architecture, the system comprising: at least one multiphase engine generator in a star configuration which provides a multiphase alternating (AC) voltage; a converting circuit for converting the multiphase AC voltage into a corresponding direct (DC) voltage for supplying at least one aircraft load; an electric power supply interface for connection with a standardized GPU plug of an external GPU, the electric power supply interface comprising a supply voltage output terminal coupled to a self-contained power source for providing a low voltage control signal for driving a GPU internal switching circuit in order to control the operation of the GPU internal generator wherein the power source and thus the low voltage control signal generated by the power source is decoupled (i.e. galvanic separated) and thus independent from the AC voltage and DC voltage.

An aircraft, in particular wide-body aircraft, comprising: first and second aircraft engines; first and second pairs of engine generators coupled to the first and second aircraft engines, respectively, an electric power supply system according to the present invention.

An airport power supply system, comprising an aircraft according to the present invention and at least one standardized GPU which is configured to provide an auxiliary supply energy is case the engine generators of the aircraft are not operated, each of the CPUs having at least one standardized GPU power supply interface, wherein the GPU power supply interface is coupleable with the aircraft power supply interface via corresponding conductors.

Self-contained power source in the context of the present patent application means that the power source is isolated from other power sources, such as the aircraft side AC and DC power supply which are normally coupled to the aircraft body and thus to the reference ground.

The idea underlying the present invention is to provide a transformer-less HVDC architecture for use in an aircraft. Therefore, engine generators in a star configuration are provided which referring to their output voltages correspond to the one of a standardized GPU. Thus, a transformer for adapting the AC voltages provided by the GPU and the aircraft engine generators is not needed. However, with this HVDC architecture special generators with isolated neutral points, as well for the aircraft engine generators and for the GPU generators are needed for operation. With that possibility a grounding of one phase of the rectifier output is possible without the need of an isolating transformer.

Another advantage of this HVDC architecture is the possibility of using the aircraft body for the return current which is in particular weight reducing. This way, an efficient and especially weight optimized HVDC architecture of the electric power supply system for an aircraft is provided.

Further embodiments of the present invention are subject of the further subclaims and of the following description, referring to the drawings.

According to a first embodiment the engine generator is designed such that the magnitude and phase of the AC voltage produced by the engine generator corresponds to the one of the AC voltage provided by a standardized external GPU. The technical requirements of such standardized CPUs are defined for example in ISO 6858. For example, today's standardized external GPUs have a 3-phase voltage of 115 V AC with a fixed frequency of 400 Hz. A modern aircraft may need one of these GPU systems, however, modern aircraft with higher energy consumption can use two or more of these GPUs. In this case, the engine generators of the aircraft may be designed to provide a 3-phase 115 Volt AC voltage. The 3-phase converter circuit is then designed to convert the 3-phase 115 Volt AC voltage into a 270 DC voltage which is supplied to the electric loads. In this implementation, since the phases and the magnitude of the AC voltage of the GPU and the engine generator are the same, no transformer is needed, a weight optimized which allows transformer-less HVDC architecture.

According to a preferred embodiment the star configuration of the engine generator comprises an isolated neutral point. Isolated in this context means that the neutral point is not connected to a fixed voltage, such as reference ground or the grounded aircraft body. In particular, the neutral point of the engine generator is floating depending on the phase of the current/voltage provided by the generator and/or the ground potential. In a transformer-less HVDC structure with a star configuration of the engine generators this circuit configuration is necessary in order to couple an external GPU system to the aircraft interface and to use the aircraft body (fuselage) as the return path. Otherwise, there will be unwanted overvoltage effects and/or a bridge short-circuit occurs may occur. This way, an energy supply system is provided which goes without a transformer and a separate line for the return path which is advantageous with regard to weight reduction approaches.

In a preferred embodiment, the electric power supply interface further comprising a neutral conductor input terminal which corresponds to a neutral conductor output terminal of the GPU. The neutral conductor input terminal is configured such that in a connected state, the neutral conductor output terminal of the GPU plug and/or the neutral conductor input terminal is/are isolated or at least decoupled from the aircraft body. A connected state defines a state where the GPU plug connector is connected to the electrical socket of the electric power supply interface. The GPU is connected to the aircraft via a standardized plug connector which has (in terms of electric power supply) 5 pins, i.e. three pins for providing the 3-phase AC voltage, the neutral conductor pin and a fifth pin for the control signal generated by the aircraft in order to control operation of the GPU internal switching circuit. Additionally, the GPU plug may also comprise one or more other pins. E.g., a standardized GPU plug comprises a sixth pin, which is used for monitoring purposes and which is thus not relevant for the auxiliary power supply via the GPU. It is important that at least the neutral conductor pin and preferably every other pin of the GPU plug connector and the electrical socket (aircraft interface) is/are electrically isolated from the aircraft body. Isolated within the meaning of the present patent application means galvanic separated.

According to a preferred embodiment the power source is configured to produce such a low voltage control signal which is suited to switch a switching element of the GPU internal switching circuit. In particular the power source circuit is configured to provide a potential free control signal. The switching element is typically a power switch, such as a contactor or a relay. In order to control operation of the power switch a low voltage control signal is needed which is in the range of 18-36 Volt. In order to provide an aircraft side control of the operation of the GPU, the aircraft preferably provides a low voltage signal (e.g. a 28 Volt control signal). By interrupting the low voltage control signal it is possible to disconnect the power switch from the aircraft side and thus the operation of the GPU. Since the negative pole of the power source is connected to the aircraft body, this terminal must not be used. Therefore, according to an embodiment of the invention the control signal is generated using the AC voltage generated by the GPU or the DC voltage generated by the aircraft's electric power supply system.

As already mentioned, the neutral conductor of the GPU or the corresponding pin at the GPU plug connector and/or the neutral conductor input terminal is isolated form the aircraft body. For this purpose, in an embodiment the system further comprises a monitoring circuit connected between the neutral conductor input terminal and the aircraft body for monitoring whether the neutral conductor of the GPU plug is isolated from the aircraft body. Preferably, the monitoring system is part of the power source since the power source preferably uses this neutral line.

According to a further embodiment the system further comprises a control circuit for controlling the operation of the electric power supply system via the engine generator and the CPUs. Preferably, the monitoring system is part of the control circuit.

In a preferred embodiment the control circuit is configured to electrical interrupt (or disconnect) a connection between the electric power supply system and at least one GPU which is mechanically connected to the electric power supply system if the monitoring system detects that the neutral conductor of the GPU plug is not electrically isolated from the aircraft body. This way it will be prevented that a defective plug connector or electric socket leads to an electrical connection of the neutral line with the aircraft body. Preferably, the control circuit is also configured such to deactivate the GPU internal relay or contactor. This may be done via a so-called RCCB (remote control circuit breaker). Still another possibility is to interrupt or disconnect the AC side master switch and/or DC side switches which has the consequence that an AC side busbar connection of the electric power supply system is interrupted.

According to a further embodiment one phase of the output of the converting circuit and/or at least one electrical load is connected to ground reference, in particular to the aircraft body (fuselage). The aircraft body is typically connected to the airport reference ground. The voltage converting circuit is a multiphase rectifying circuit, in particular a multiphase bridge rectifier.

According to a further embodiment the system comprises a switching circuit which is designed to switch the electric loads to the DC voltage. Additionally or alternatively, the switching circuit is designed to decouple the rectifier circuit from the AC voltage and/or to disconnect an AC busbar connection. There are different approaches to implement the switching circuit, i.e. depending on the system architecture of the power supply system the different switches of the switching circuit may be arranged in different voltage levels. In a first implementation the switching circuit has the function of a circuit breaker. In this implementation the switching circuit comprises one or more master switches (or disconnect switches) such as a RCCB switch. This circuit breaker is typically arranged at the AC side of the power supply system. Additionally or alternatively, the switching circuit is arranged on the DC side of the power supply system and is thus connected downstream the voltage converting circuit. In this implementation the switching circuit comprises a plurality of power switches, in particular MOSFETs, JFETs or IGBTs, for switching different loads and/or DC circuit levels.

According to a further embodiment at least one on-board auxiliary energy supply device is provided. The on-board auxiliary energy supply device may be a regular APU and/or at least one fuel cell. The on-board auxiliary energy supply device is configured to provide electric energy if the aircraft engines are off. In particular fuel cells are advantageous in these situations in order to provide a DC voltage for the DC loads.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

In all figures of the drawings elements, features and signals which are the same or at least have the same functionality have been provided with the same reference symbols, unless explicitly stated otherwise.

DETAILED DESCRIPTION

Figure 1:
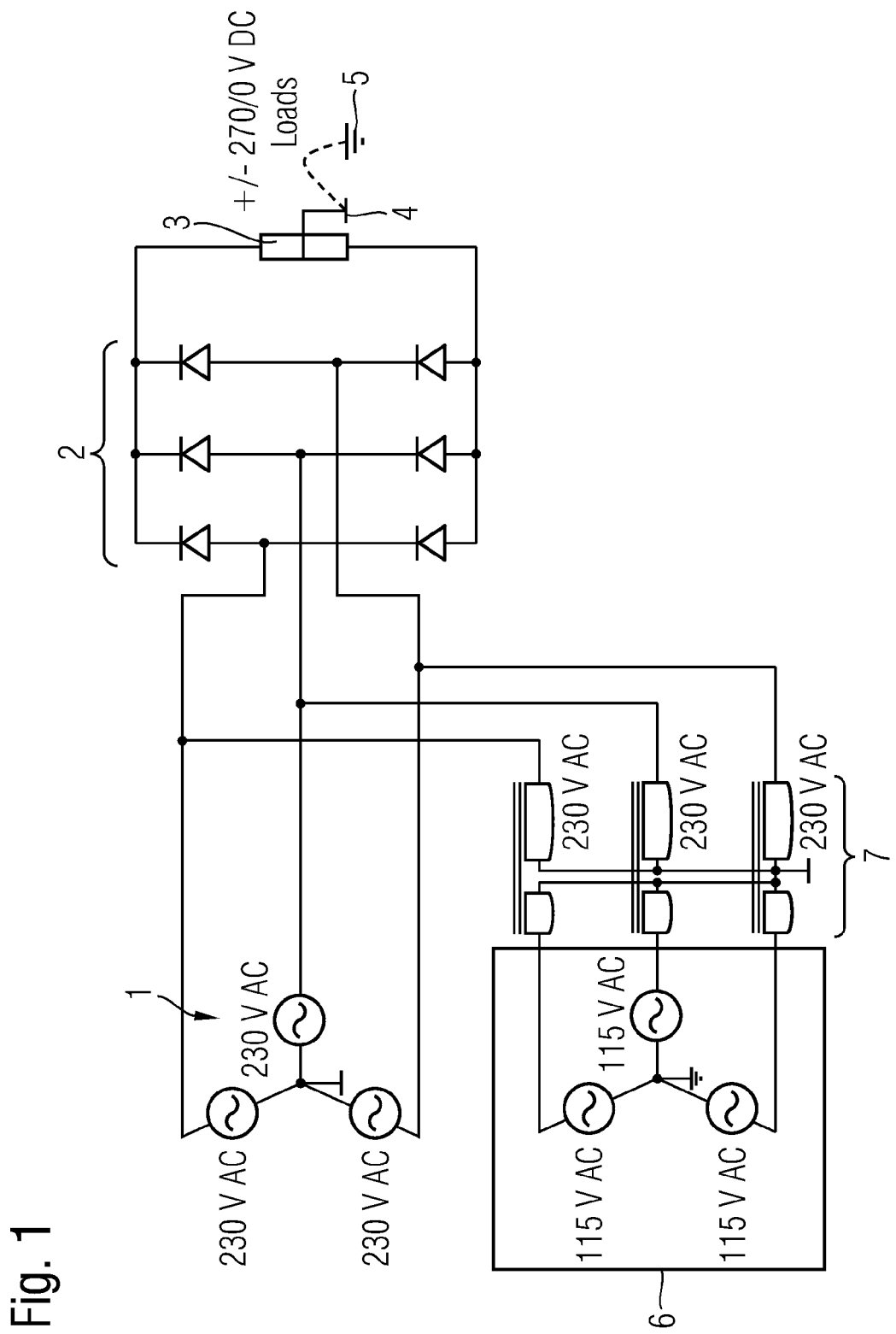
FIG. 1 shows a block diagram for the implementation of an exemplary HVDC based on-board power supply architecture.

FIG. 1 shows a block diagram according to an exemplary approach.

Figure 2:
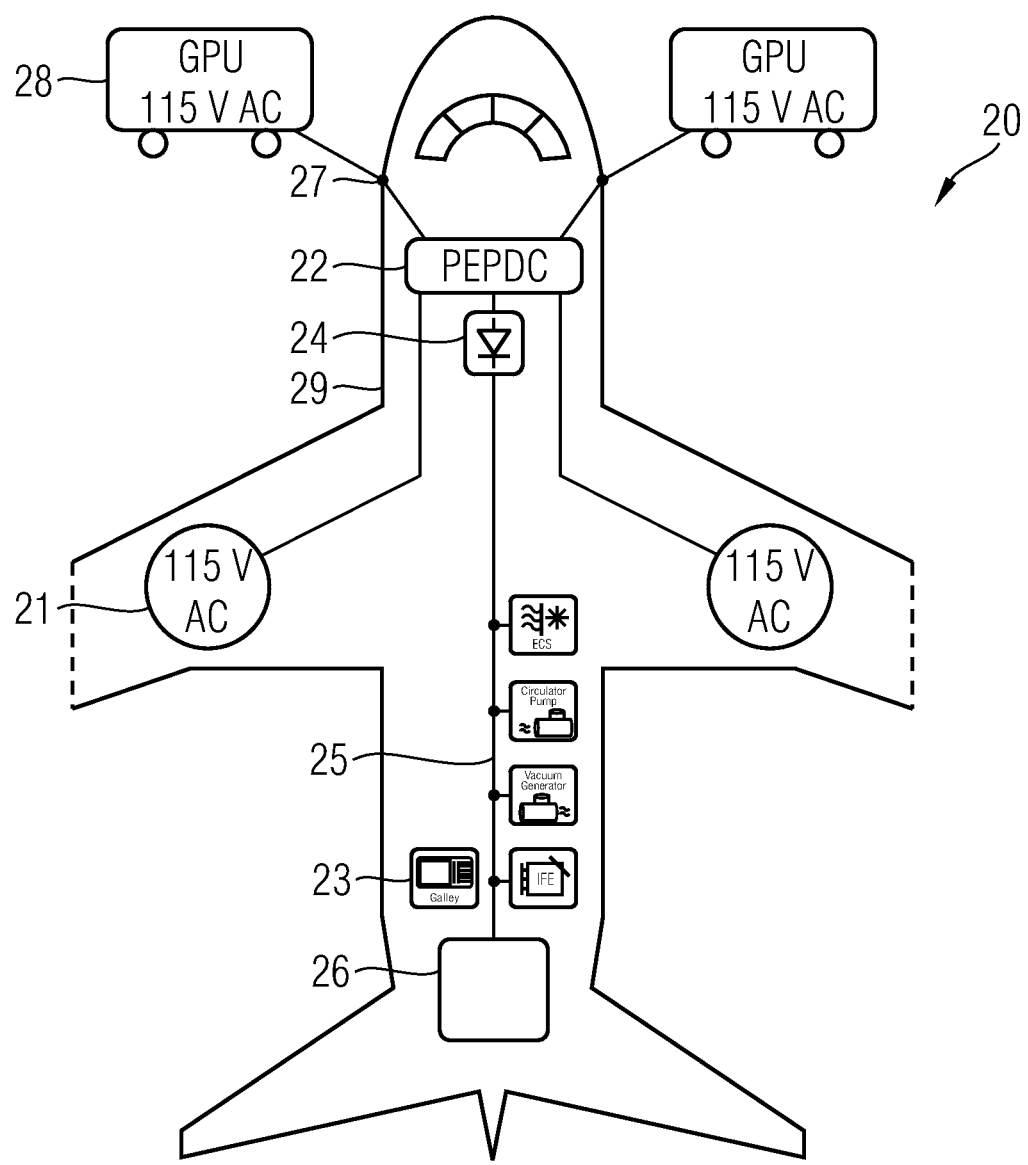
FIG. 2 shows a block diagram of an aircraft according to the present invention.

FIG. 2 shows a block diagram of an aircraft according to the present invention. In FIG. 2 reference symbol 20 denotes the aircraft. The aircraft 20 comprises a 3-phase on-board electric power supply system having a supply voltage of 115 Volt and having a transformer-less HVDC architecture. The electric power supply system comprises in this example two engine generators 21 which are driven by a corresponding engine of the aircraft. The engine generators 21 generate a 115 V AC voltage of variable frequency, typically of 360-800 Hz, as a function of the rotational speed of the engine. The engine generators 21 are connected to a primary electrical power distribution center (PEPDC) 22 which received the AC voltage.

The aircraft 20 further comprises several loads 23 such as thermal loads, loads with an integrated converter, such as a ventilation, a galley, etc. The PEPDC 22 is connected via a rectifier circuit 24 and a HVDC bus 25 to the loads 23. The purpose of the rectifier circuit 24 is to convert the AC voltage at an output of the PEPDC 22 into a DC voltage which is then provided to the different loads 23.

The aircraft 20 comprises at the HVDC side of the electric power supply system at least one auxiliary power unit 26, which in the present example is a fuel cell arrangement. The different fuel cells of the auxiliary power unit 26 provide electrical energy if e.g. the aircraft engines are off and thus the engine generators 21 do not produce electrical energy for supplying the loads 23.

The aircraft 20 comprises interfaces 27 for connecting the aircraft to external auxiliary power units 28, such as standardized GPUs 28. In the present example two GPUs 28 are shown. The GPUs 28 are configured to generate a 115 V AC voltage of a constant frequency (e.g. 400 Hz) or variable frequency. The GPUs 28 are connected via the interface 27 to the PEPDC 22.

The aircraft body 29, which forms the fuselage or aircraft chassis, is connected to the airport ground (not shown in FIG. 2).

Figure 3:
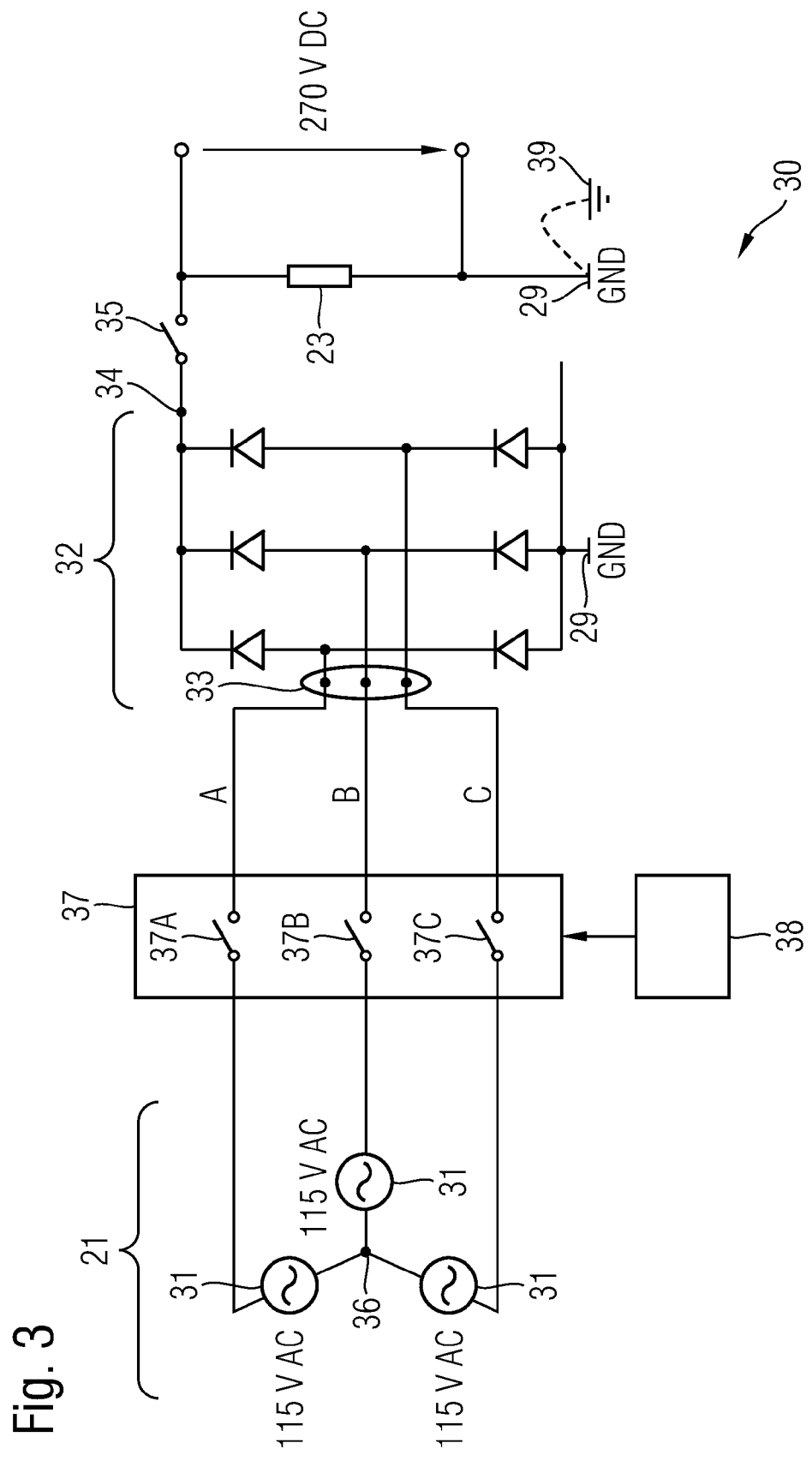
FIG. 3 shows a block diagram of a first embodiment of an electric power supply system according to the present invention.

Hereinafter, the structure and functionality of an electric power supply system according to the present invention is described by means of the block diagram of FIG. 3. In FIG. 3 the electric power supply system is denoted by reference number 30.

The electric power supply system 30 comprises an engine generator 21 and a rectifier unit 32 which is connected downstream the engine generator 21.

The engine generator 21 provides a 3-phase AC voltage. The engine generator 21 consequently comprises three generator windings 31 which are arranged in a star configuration. Each of these three generator windings 31 generates a 115 AC voltage which forms one phase A, B, C of the AC output voltage of the engine generator 21. These three phases A, B, C of the 115 AC voltage are then provided to corresponding inputs 33 of the 3-phase rectifier unit 32. The rectifier unit 32 is in the present example a bridge rectifier whereas every bridge of the rectifier unit 32 is connected at an output side to an output terminal 34. Further, the rectifier unit 32 is connected to the aircraft body 29 and thus to the ground potential GND. The aircraft body 29 forms the return conductor. The rectifier unit 32 provides at the output terminal 34 a 270 Volt DC voltage which is suited to supply several DC loads 23 connected to the electric power supply system 30 via the HVDC bus 25. In order to switch the loads 23 to the DC voltage of the HVDC bus 25, several DC power switches 35 are arranged in the HVDC bus 25 whereas FIG. 3 shows exemplarily only one power switch 35.

In the present example the neutral point 36 of the star configured engine generator 21 is isolated, i.e. the neutral point 36 is not connected with a defined reference voltage, such as reference ground. In particular, this neutral point 36 is floating depending on the used phase A, B, C of the AC voltage.

Since, on the reference side the aircraft loads 23 are connected to the aircraft body 29 which is connected to the airport earth 39 and which is thus charged with airport ground, the aircraft body 29 forms the common reverse conductor of the electric power supply system 30. Thus, an additional line for the reverse conductor is not needed.

The loads 23 are typically switched via corresponding power switches (not shown in FIG. 3) which are arranged at the DC side of the electric power supply system 30 in order to switch the loads. In particular, at the DC side of the electric power supply system 30 there may be different circuit levels (not shown in FIG. 3). These switches of the switching circuit 37, which may be power MOSFETs, JFETs, IGBTs, Thyristors or other types of DC-switches, are controlled via a corresponding control unit (not shown).

Additional, electric power supply system 30 comprises a switching circuit 37 which is arranged on the AC side of the electric power supply system 30. This switching circuit 37 is for example arranged between the engine generator 21 and the rectifier unit 32. This switching circuit 37 acts as a busbar control for connecting and disconnecting the busbar lines at the AC side. The switching circuit 37 comprises several master switches (or disconnect switches, circuit breakers or the like) These switches of the switching circuit 37 which are preferably RCCB switches, however, in another embodiment these switches may also be power MOSFETs, JFETs, IGBTs, Thyristors, or other types of AC-switches, are controlled via a corresponding control unit 38.

Figure 4:
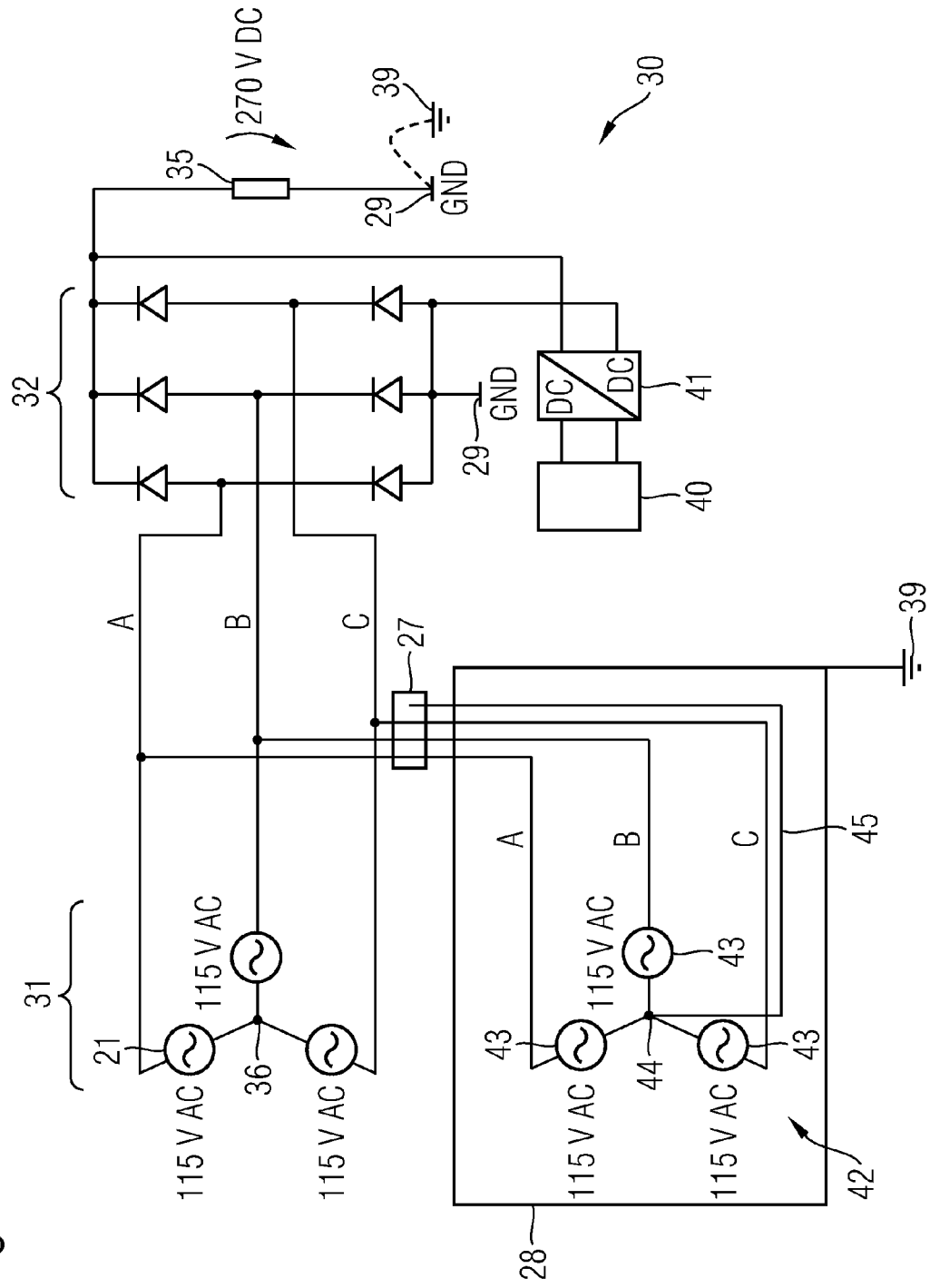
FIG. 4 shows a block diagram of a second embodiment of an electric power supply system according to the present invention.

FIG. 4 shows a block diagram of the electric power supply system 30 according to the present invention having auxiliary power units.

In the first instance, the electric power supply system 30 comprises at least one fuel cell 40 which provides a DC voltage. The fuel cell 40 is connected via a DC/DC converter 41 to the output unit 34 of the rectifier unit 32. The DC/DC converter 41 is designed to convert the fuel cell output voltage to a 270 DC voltage as needed for the HVDC bus 25 to supply the loads 36.

Further, a mobile GPU 28 is connected to the aircraft. The GPU comprises a GPU generator 42 which provides a 3-phase 115 AC voltage to the aircraft via a corresponding interface 27 which will be described in more detail with regard to the subsequent embodiments of FIGS. 5 and 6. The GPU generator 42 is configured similar to the aircraft engine generator 21 and consequently comprises three GPU generator windings 43 which are arranged in a star configuration. The GPU generator 42 is connected to the input 33 of the rectifier unit 32 of the aircraft electric power supply system 30. Each of the three GPU generator windings 43 generates a 115 AC voltage which forms a corresponding phase A, B, C of the AC output voltage of the GPU generator 42. The neutral point 44 of the star configuration GPU generator 42 is connected to the neutral terminal 45 if the GPU's chassis is earthed (in FIG. 4 only schematically shown). This neutral point 44 is isolated, i.e. the neutral point 44 is not connected with a defined reference voltage and especially not with the aircraft body 29 or the GPU body.

Figure 5:
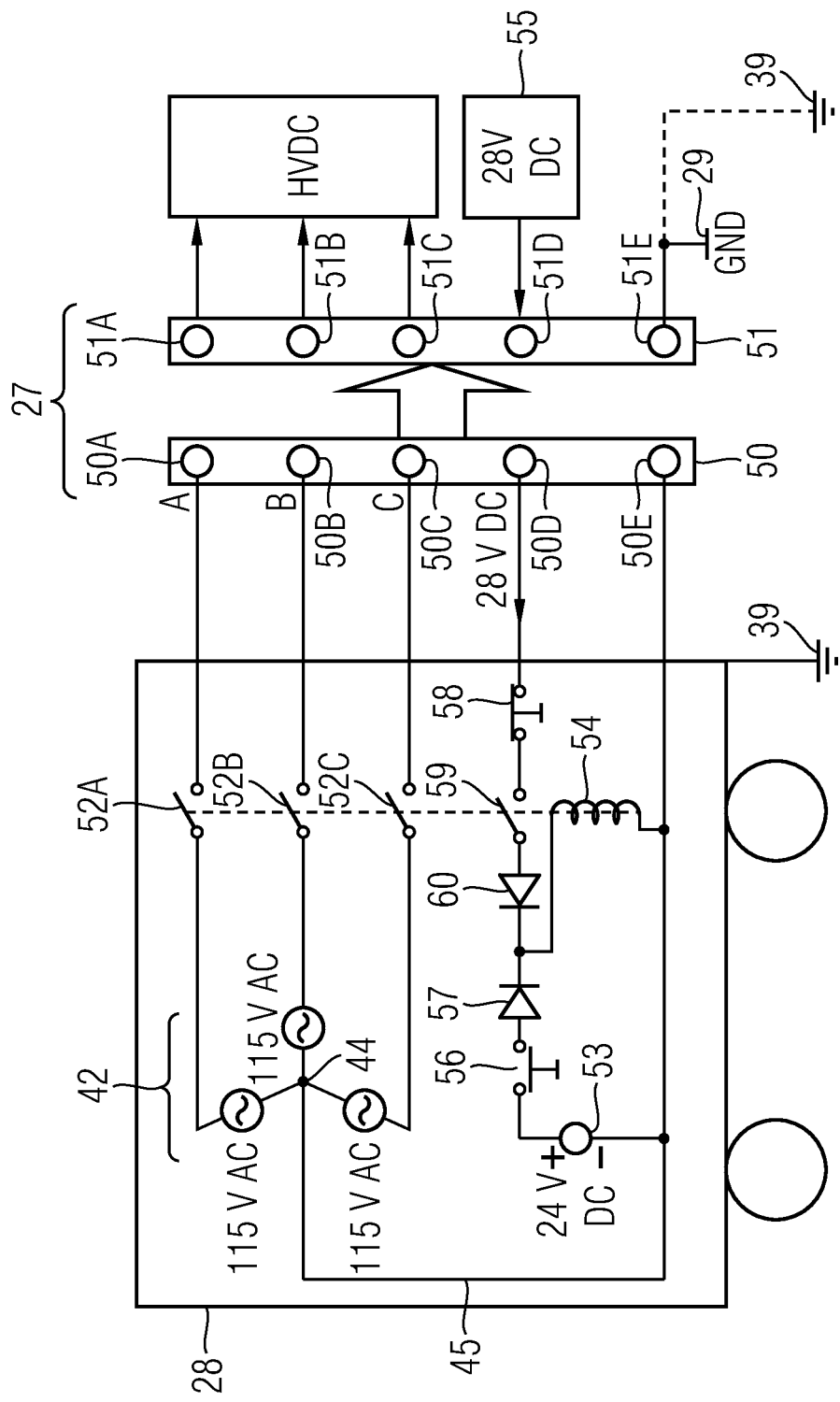
FIG. 5 shows a block diagram of a third embodiment of an electric power supply system according to the present invention which is coupled to an external GPU.

FIG. 5 shows a block diagram of a third embodiment of an electric power supply system according to the present invention which is coupled to an external GPU.

FIG. 5 shows a more detail circuit arrangement of the interface 27 between GPU and aircraft. The interface 27 is realized on the GPU side by a GPU plug 50 and on the aircraft side by a corresponding aircraft GPU contactor 51. Both units 50, 51 have (with regard to the AC power supply) 5 relevant pins which correspond to each other. In the following corresponding pins (50A . . . 50E, 51A . . . 51E) of the GPU plug 50 and the aircraft GPU contactor 51 are indexed with the same letters A . . . E.

The GPU plug 50 comprises three pins 50A-50C for the three different phases A . . . C provided by the GPU generator 42. The corresponding pins 51A-51C of the aircraft GPU contactor 51 which are connected to the aircraft loads are configured to receive corresponding phases A . . . C of the 115 AC voltage of the GPU generator 42.

Between the GPU generators 43 and the corresponding pins 50A-50C switches 52A-52C are arranged. These switches 52A . . . 52C are intended to switch corresponding phases A . . . C of the 115 AC voltage to the corresponding pins 50A-50C. These switches 52A-52C are controlled and driven by a relay 54.

The relay 54 is connected between a GPU internal low voltage power supply source 53 which provides a 24 Volt DC voltage. The negative terminal of the low voltage power supply is directly connected to the neutral line 45 of the GPU 28. This neutral line 45 is connected with the neutral point 44 of the GPU generator 42, the negative terminal of the low voltage power supply 53 and the neutral pin 50E of the GPU plug 50. The positive terminal of the low voltage power supply 53 is connected via a Power-On switch 56 (ON button) and a diode 57 (e.g. a blocking diode) to the positive terminal of the relay 54. In this situation and when the Power-On switch 56 is pressed, the relay 54 is powered via the GPU internal low voltage power supply source 53.

In order to control the relay 54 from the side of the aircraft the aircraft GPU contactor 51 comprises a fourth pin 51D which is connected to an aircraft independent supply voltage source 55. This supply voltage source 55 provides a 28 Volt DC signal. This 28 Volt DC signal forms a control signal for controlling the operation of the relay 54 if the GPU plug 50 is connected to the aircraft GPU contactor 51. For this purpose, the GPU plug 50 comprises a fourth pin 50D which is connected to the positive terminal of the relay 54 via a Power-Off switch 58 (OFF button), a switch 59 controlled via the relay 54 and a diode 60 (which is e.g. a blocking diode).

In a connected state of the GPU plug 50 and the aircraft GPU contactor 51, the relay 54 will be activated via the GPU internal low voltage power supply source 53. This relay 54 is then able to control operation of the switches 52A-52C. Then, the relay 54 will be supplied by a higher voltage provided from the supply voltage source 55. Then, the connection to the low voltage power supply source 53 will be disconnected if the Power-On switch 56 is released.

The neutral line 45 which is connected to the neutral point 44 of the GPU generator 42 and the neutral pin 50E is decoupled from the aircraft body. This may be realized in a first configuration in that the both pins 50E, 51E of the GPU plug 50 and the aircraft GPU contactor 51 do not have a physical connection with each other. In another embodiment, the pin 51E of the aircraft GPU contactor 51 is not connected to the aircraft body.

Figure 6:
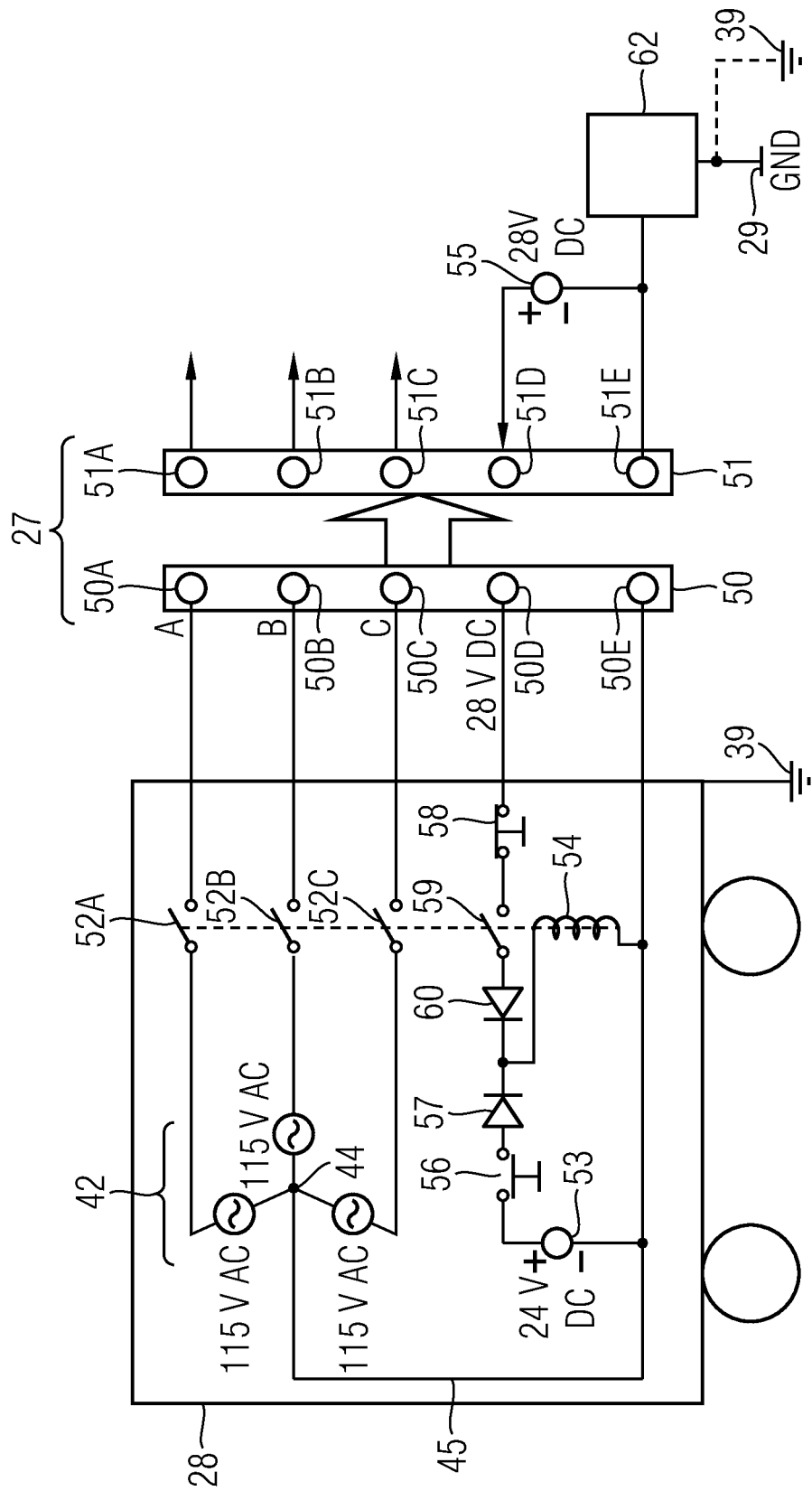
FIG. 6 shows a block diagram of a fourth embodiment of an electric power supply system according to the present invention which is coupled to an external GPU.

FIG. 6 shows a block diagram of a fourth embodiment of an electric power supply system according to the present invention which is coupled to an external GPU.

In this embodiment, the supply voltage source 55 of the aircraft is connected between the pins 51D, 51E of the aircraft GPU contactor 51. This way, the supply voltage provided by the supply voltage source 55 is independent from the energy system of the aircraft.

Further, a monitoring circuit 62 is provided. The monitoring circuit 62 is connected between the negative terminal of the supply voltage source 55 and thus the neutral pin 51E and the grounded aircraft body. This monitoring circuit 62 is designed to monitor whether the neutral pins 50E, 51E are decoupled from the aircraft body or from each other. Otherwise the monitoring circuit 62 disables (e.g. via a corresponding control circuit which is not shown in FIG. 6) the supply voltage source 55 and thus the operation of the GPU 28. For this purpose, it is advantageous that the monitoring circuit 62 is part of the supply voltage source 55. In an additional or alternative embodiment, this control circuit may also disconnect the master switches 37A-37C within the switching circuit 37 at the AC side of the at the electric power supply system 30.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims.

It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

In this document, relational terms such as first and second, top and bottom, and the like may be used solely to distinguish one entity or action from another entity or action without necessarily requiring or implying any actual relationship or order between such entities or actions. Further, the terms "comprise/comprising", "have/having", "include/including", "contain/containing" or any variation thereof, are intended to cover a non-exclusive inclusion, such that the process, method, article, apparatus does not include only those elements/steps but may include other elements/steps not expressly listed or inherent to such process, method, article, or apparatus. Further, the terms "a/an" are defined as one or more unless explicitly stated otherwise.

The electric power supply system according to the present invention is suitable for any desired aircraft, in particular (wide body) passenger aircraft, cargo aircraft, but also helicopters.

Further, the amount of GPUs, engine generators, rectifier units, fuel cells and the like are only given for illustrative purposes. Further, the magnitudes of the generated AC and DC voltage should be only understood as examples and not as restricting figures. It is self-understood that depending on the layout of the engine generators and the GPU generators other AC and DC voltages may be generated. The same applies for the amount of phases of the engine generators.

Further, it should be noted that it is also possible to provide circuit-wise an inverse architecture without deriving from the scope of the present invention. With this inverse architecture, the terminal 29 of the rectifier circuit 32 is no more grounded and no more connected to the aircraft body; instead the output terminal 34 of the rectifier circuit 32 is grounded. Consequently, in this inverse architecture the rectifier circuit 32 is arranged between the output terminal 34 having ground potential GND and the terminal 29 having a negative DC voltage (e.g. −270 V). At the loads 23 there is a negative voltage drop (e.g. −270 V). In still another embodiment, a reversing of the rectifier circuit 32, i.e. reversing the diodes of the rectifier circuit 32, would lead to a similar effect. The same may apply to the GPU internal circuitry.

What is claimed is:

1. An electric power supply system for an aircraft having a transformer-less HVDC architecture, the system comprising:
   at least one multiphase engine generator in a star configuration which provides a multiphase alternating (AC) voltage;
   a converting circuit for converting the multiphase AC voltage into a corresponding direct (DC) voltage for supplying at least one aircraft electrical load;
   an electric power supply interface for connection with a standardized ground power unit (GPU) plug of an external GPU, the electric power supply interface comprising a supply voltage output terminal coupled to a self-contained power source for providing a low voltage control signal for driving a GPU internal switching circuit, wherein the power source is decoupled from the AC voltage and DC voltage, and a neutral conductor input terminal which corresponds to a neutral conductor output terminal of the GPU; and
   a monitoring circuit connected between the neutral conductor input terminal and the aircraft body for monitoring whether a neutral conductor of the GPU plug is isolated from a body of the aircraft.

2. The system according to claim 1, wherein the at least one multiphase engine generator is designed such that a magnitude and phase of the multiphase AC voltage produced by the engine generator corresponds to at least one AC voltage provided by a standardized external GPU.

3. The system according to claim 1, wherein the star configuration of the at least one engine generator has an isolated neutral point.

4. The system according to claim 1, wherein the neutral conductor input terminal is configured such that, in a connected state, the neutral conductor output terminal of the GPU plug and/or the neutral conductor input terminal is/are isolated from the aircraft body.

5. The system according to claim 1, wherein the self-contained power source is configured to produce a low voltage control signal which is suited to switch a switching element of the GPU internal switching circuit.

6. The system according to claim 1, wherein the self-contained power source is configured to provide a potential free control signal.

7. The system according to claim 1, further comprising at least one control circuit for controlling operation of the electric power supply system via the engine generators and the GPUs.

8. The system according to claim 7, wherein the control circuit is configured to electrically interrupt a connection between the electric power supply system and at least one GPU and/or an AC side busbar connection of the electric power supply system if the monitoring circuit detects that the neutral conductor output terminal of the GPU plug is not electrically isolated from the aircraft body.

9. The system according to claim 1, wherein one phase of an output of the converting circuit and/or at least one electrical load is connected to a ground reference, in particular to the aircraft body.

10. The system according to claim 1, wherein the converting circuit is a multiphase rectifying circuit, in particular a multiphase bridge rectifier.

11. The system according to claim 10, further comprising a switching circuit to switch electrical loads to the DC voltage and/or to decouple the multiphase rectifying circuit from the AC voltage and/or to disconnect an AC busbar connection.

12. The system according to claim 1, further comprising at least one on-board auxiliary energy supply device, in particular an auxiliary power unit (APU) and/or a fuel cell, configured to provide electric power if aircraft engines are off.

13. An aircraft, in particular wide-body aircraft, comprising:
   first and second aircraft engines;
   first and second pairs of engine generators coupled to the first and second aircraft engines, respectively; and
   an electric power supply system according to claim 1.

14. An airport power supply system comprising:
   an aircraft according to claim 13 and
   at least one standardized GPU which is configured to provide an auxiliary supply energy when the engine generators of the aircraft are not operating, each of the GPUs having at least one standardized GPU power supply interface, wherein the GPU power supply interface is configured to couple with the electric power supply interface of the aircraft via corresponding conductors.

* * * * *